US006012036A

United States Patent [19]

O'Brien, Jr.

[11] Patent Number: 6,012,036
[45] Date of Patent: *Jan. 4, 2000

[54] SITE AND WORKSPACES LAYOUT PROCESS EMPLOYING MDS A PDI FORMULA IN WHICH DENSITY IS CALCULATED USING MEASURED SPAN OF CIRCUMSCRIBING-CONVEX-HULLS

[75] Inventor: Francis J. O'Brien, Jr., Newport, R.I.

[73] Assignee: The United States of America as represented by the Secretary of the Navy, Washington, D.C.

[ * ] Notice: This patent is subject to a terminal disclaimer.

[21] Appl. No.: 08/635,418

[22] Filed: Mar. 28, 1996

[51] Int. Cl.$^7$ ...................................................... G06F 17/50
[52] U.S. Cl. ................................................. 705/5; 364/512
[58] Field of Search ................................... 705/1, 5, 6, 8; 364/400, 512, 578, 468.04; 434/72

[56] References Cited

U.S. PATENT DOCUMENTS

| | | | |
|---|---|---|---|
| 4,964,060 | 10/1990 | Hartsog | 364/512 |
| 5,235,506 | 8/1993 | O'Brien, Jr. | 364/512 |
| 5,402,335 | 3/1995 | O'Brien | 364/512 |

*Primary Examiner*—Frantzy Poinvil
*Attorney, Agent, or Firm*—Michael J. McGowan; Michael F. Oglo; Prithvi C. Lall

[57] ABSTRACT

A process is provided for producing layouts of building units on a quadrilateral facility site, and layouts of personnel workstations and items of equipment (collectively "workplace elements") in quadrilateral subarea in the building units. There are inter-building-unit, and inter-workplace-element, operational criteria associated with the activity being performed in the facility. Multi-dimensional scaling (MDS) methodology is employed in optimizing building unit and workplace element configurations to suit the operational criteria. Measurement of population density index (PDI) is employed to judge whether candidate configurations of building units and workplace elements result in adverse crowdedness conditions. The PDI employed for this purpose is novel. The novelty of the PDI is its use of a "convex hull" (in the mathematical sense of the term) circumscribed about the perimetrical objects in a candidate configuration. The equation for the PDI then employ the polygon interior of the convex hull in calculation of a density related term of the equation.

10 Claims, 9 Drawing Sheets

SITE AND WORKSPACES LAYOUT PROCESS EMPLOYING MDS A PDI FORMULA IN WHICH DENSITY IS CALCULATED USING MEASURED SPAN OF CIRCUMSCRIBING-CONVEX-HULLS

CROSS-REFERENCE TO RELATED APPLICATIONS

The instant application is related to two-pending U.S. Patent Applications entitled SITE AND WORKSPACES LAYOUT PROCESS EMPLOYING MDS AND A PDI FORMULA IN WHICH DENSITY IS BASED ON AREA OF CIRCUMSCRIBING-CONVEX-HULLS now pending (U.S. patent application Ser. No. 08/635,417); and SITE AND WORKSPACES LAYOUT PROCESS EMPLOYING MDS AND A PDI FORMULA IN WHICH DENSITY IS CALCULATED USING A UNIT LATTICE SUPERPOSED OVER CIRCUMSCRIBING-CONVEX-HULLS now U.S. Pat. No. 5,877,967 U.S. patent application Ser. No. 08/635,419) having same filing date.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to improvements in the art of producing optimized layouts of objects in functional organizations, including the location of building units of multiple building functional facilities and location of personnel work stations and equipments (collectively workplace elements") in functional workspaces. In one of its aspect, the invention relates to a non-metric multidimensional scaling (MDS) matrices process which optimizes these layouts according to patterns of inter-object operational criteria. In another of its aspects it relates to the measurement of crowdedness of the objects ("population density index"). In still another of its aspect it relates to a novel computational geometry technique enabling measurements of crowdedness from data in the form of span measurements (as where working from aerial photographs).

(2) Description of the Prior Art

A paper, T. Tullis, B. B. Sperling and A. L. Steinberg (1986), "The Use of Multidimensional Scaling for Facilities Layout: An Application to the Design of the Space Station", outlines a process employing the multidimensional scaling (MDS) methodology to modify an experimental layout of a workspace of a naval vessel from at an analytical viewpoint of optimizing performance of a set of operational criteria associated with the function of the workspace on the naval vessel. However, the disclosed process make no provision for any consideration of crowdedness (population density) in connection with the modification.

An abandoned U.S. patent application Ser. No. 07/754,779 filed Aug. 30, 1991 (which is accessible to the public by virtue of it being referred to in. inter alia, a U.S. Pat. No. 5,235,506 to F. J. O'Brien, Jr.) discloses a process for calculating a form of a population density index (PDI). This abandoned application goes on to make the observation that use of PDI data in MDS would provide additional data for facilities layout. However, there is no disclosure or teaching of how to employ PDI data with MDS. Also, the form of density calculation of employed by the PDI equation disclosed therein is based upon the area of the full bounds of the quadrilateral the workspace in which a layout configuration is located. As will become apparent, of in accordance with the present invention a different form density calculation is employed in the PDI equation.

Other related references included U.S. Pat. No. 5,402,335 to F. J. O'Brien, Jr. which discloses a process for producing optimized layouts including of calculation of a non-metric PDI MDS matrix (column 24, lines 29–32, therein) which is then representing an MDS matrix of a normative ("best") a non-metric MDS matrix of other inter-object matrices (column 24, lines 35–38) are combined. As will become apparent of in accordance with the present invention, one never generates a non-metric PDI matrix and a totally different form interaction between PDI and MDS is involved. Also, the earlier mentioned U.S. Pat. No. 5,235,506, and an abandoned U.S. patent application Ser. No. 07/756,264, file Aug. 30, 1991 (but publicly available by virtue of a reference thereto, inter alia, in U.S. Pat. No. 5,235,506), each include further observations that used of PDI data in MDS would provide additional data for facilities layout. However, these observations were also made without description of a process of using PDI with MDS. As a further distinction, the PDI formula disclosed in U.S. Pat. No. 5,235,506, and that disclosed in abandoned application Ser. No. 07/756,264 have respective limitations of applicability to (I) a restricted number of objects and (ii) situations where an approximate density index is acceptable. Further each of the U.S. Pat. No. 5,402,335, U.S. Pat. No. 5,235,506 and abandoned application Ser. No. 07/756,264 disclose only forms of density calculations in their PDI formula which are based upon area of the full bounds of a quadrilateral workspace form, i.e., different from density calculation in PDI equation of the present invention.

The forms of equations supporting the calculation of PDI in all the above disclosures involving PDI have treated the density related term of the equation in ways which readily process data regarding location of the building units and workplace elements when in coordinate measurements. However, there are layout analysis problems where coordinate measurements are not easily obtained, as where working from aerial photographs. It therefore has been a continuing, but heretofore unobtained objective in the development of these layout processes for a feature enabling the process to be applied to measurements in the form of lengths of spans, as can be readily made from aerial photographs.

SUMMARY OF THE INVENTION

A process for producing layouts of building units, and layouts of personnel and equipment stations (collectively "workplace elements") within the building units. The building-unit configurations are to be located at a quadrilaterally shaped facility-wide tier ("global area") and the work element configurations are to be located at a quadrilaterally shaped workspace tier ("subarea"). A layout analyst becomes knowledgeable in or acts in concert with someone knowledgeable in the function of the facility and workplace (single or in such concert called "expert"). The expert prepares best intuitive experimental configurations of the building units in the global area and workplace elements in their subarea, which are termed "experts normative configuration". The analyst also collects data regarding inter-building-unit and inter-workplace-element operational criteria, such as for example inter-building-unit-transition-frequency and shared usages of building units. Using the well known non-metric MDS methodology, and separately processing the global area and subarea tiers, the expert's normative configuration is combined with individual matrices sets of the different operational criteria producing a set of normative configuration and operational criterion MDS matrices. Also using well known MDS methodology and again with global area and subarea tier separately processed, all the sets of normative configuration and operational criterion matrices for building units and workplace elements are combined, with uniform weighting assigned to items of the configuration, and during the combining step are interactively non-linearly stressed to produce "least bad fit" configuration for performance of the operating criteria. "Convex hulls" (in the mathematical sense of the term) are circumscribed about the "least bad fit" and expert's normative configurations, respectively, and the polygon areas of the interior of the hull are calculated using equation 8a, set forth later in this specification. Population density indices (PDIs) based upon a novel PDI formula (equation 9, later in the specification) are calculated. The equation for the novel PDI calculates a density related term using the above calculated polygon area (rather than area bounded by the quadrilaterally shaped global area and subarea, as was used in the prior art). Further, novel computational geometry is employed in the measurement of crowdedness, which enables obtaining data in the form of measured spans (rather than coordinate measurements), making the process convenient for situtions such as site layouts prepared from aerial photographs. The PDI for the "least bad fit" configuration is compared with the PDI for the "expert's normative" configuration to determine if the "least bad fit" configuration which represents a configuration presenting least stress in meeting the operational criteria is acceptable in light of impact on PDI vis-a-vis the PDI of the expert's experimental configuration.

Accordingly, the principal objects of the present invention are:

(1) To provide a novel process which aids in laying out the location of objects in a functional facility of objects (e.g., multibuilding facility, workspace) which involves both MDS methodology optimization based upon takes into consideration both inter-object operational criteria and consideration crowdedness (PDI).

(2) To provide a novel process as aforesaid wherein the measure of PDI takes into consideration an observation that human activity tends to clusters away from boundaries of facility sites or workspace areas.

(3) To provide a novel process in accordance with the preceding object which is of special utility in cases where measurements of facility site distances are readily obtainable in the form of span measurements (a where working with aerial photographs).

(4) To provide a novel process in accordance with the first above said object for laying out two tiers of a functional facility, namely a process tier of locating building units in a quadrilateral facility site and a another process tier of locating personnel workstations and equipments (collectively "workplace elements") in quadrilateral workspaces within a building unit.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Reference is now made to FIGS. 1A–1F. In accordance with the present invention there is provided a process 10, FIG. 1A, comprising a first tier of the process consisting of groups of steps 12a and 12b, FIGS. 1B and 1C, and a second tier of the process consisting of groups of steps 14a and 14b, FIGS. 1D and 1E. Groups of steps 12a and 12b relate to producing layouts of building units (including temporary structures such as tents of a facility to be located in a designated quadrilateral site ("global area")). The aim of process 10 is to produce layouts which are nearly optimal with respect to the functions being performed in the facility (first tier) and in a workspace (second tier). In both the cases of the facility and workspace there has been collected data regarding operational criteria as among the building units and workplace elements. The above-identified paper by Tullis et al. discusses and lists operational criteria useful for the first tier (process step groups 12a, 12b). They include: inter-building transition frequency, sequential activity dependencies, inter-building travel distance, shared support functions, privacy requirements of work/living spaces and volume flow among buildings. The Tullis et al paper also discusses and lists individual workspace operational criteria useful for the second tier (process step groups 14a, 14b). These include: human transition frequency, sequential activity dependencies, shared support equipment, visual/auditory interference potential and privacy requirements. The total number of criteria which process 10 can accommodate is unlimited. Among the types of functional facilities for which appropriate facility level operational criteria exist are collectible are: (1) mobile military field hospitals; (2) fixed hospital compounds; (3) aircraft rework depots; (4) industrial facilities for carrying on complex production modes; (5) facilities involved with production of nuclear energy or production of hazardous nuclear materials; (6) college campuses; and (7) prison compounds. The corresponding functional workspace within these functional facilities for which for which appropriate workspace level operational criteria exist are: (1) and (2) in hospitals-triage centers, surgery centers, x-ray centers, etc.; (3) in aircraft rework depots-workspaces for aircraft breakdown, component overhaul, parts and tool storage, reassembly; (6) in college campuses-classrooms, food service areas, labs, libraries, etc.; and (7) in prison compound-cell blocks, food service areas, laundry areas, etc.

Figure 1A:
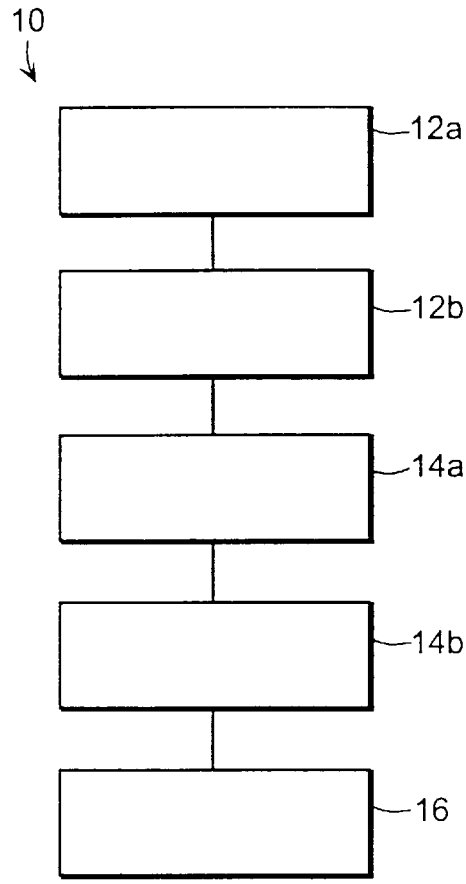
FIGS. 1A–1F are flow charts of an embodiment of process for laying out multibuilding facilities and workspaces subareas within the building.
Figure 1F:
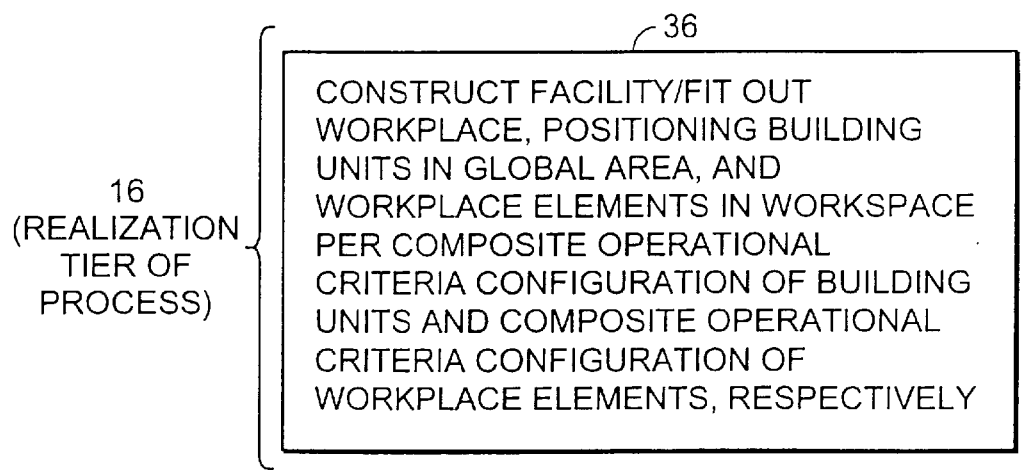
Figure 1B:
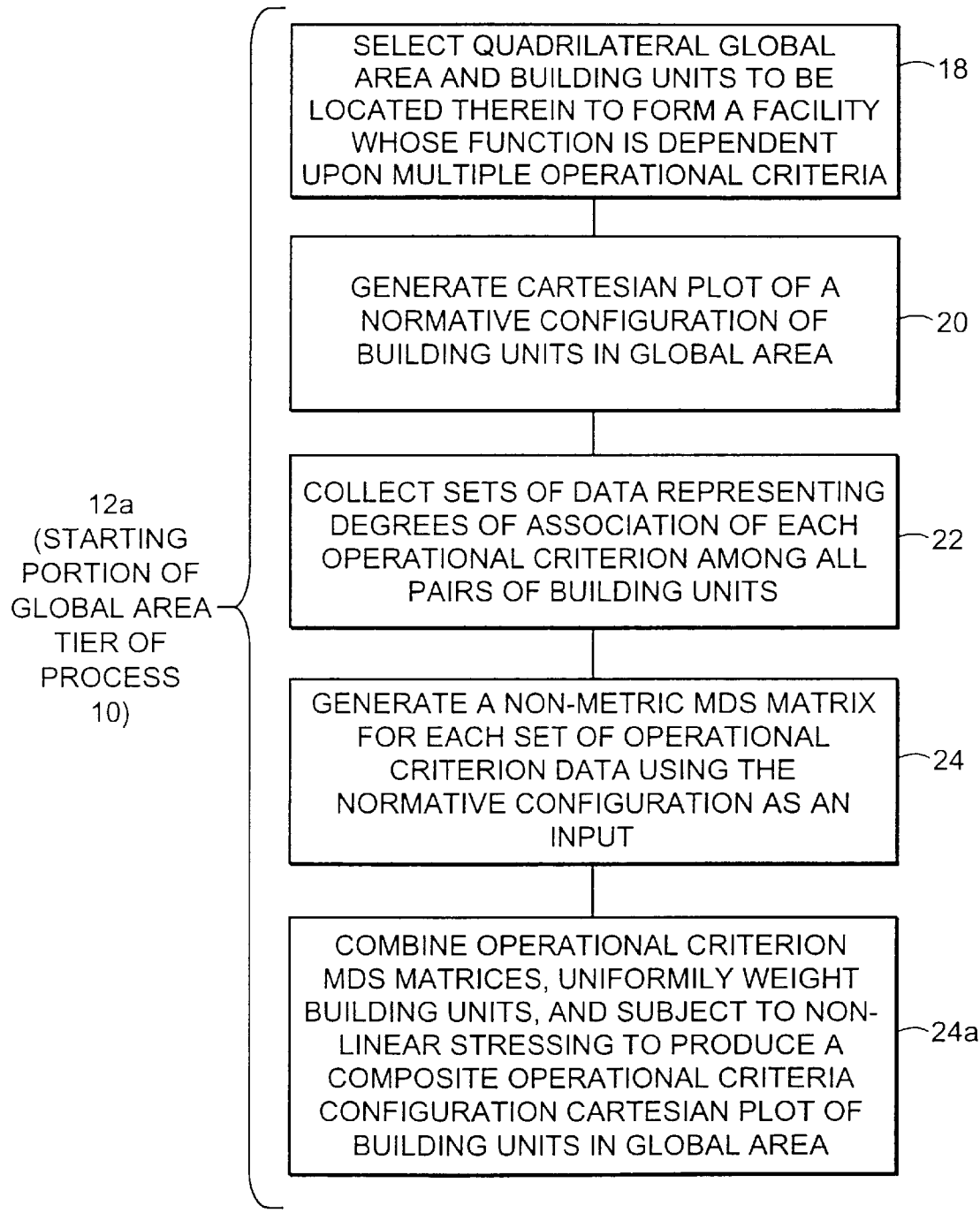

Final actual construction of a facility, and any appropriate construction and fitting out of the workspace takes place, constitutes a realization tier 16, FIG. 1F of process 10.

Reference is now made to FIGS. 2, 3, 4, 5A and 5B. The present and succeeding eleven (11) paragraphs constitute discussion of the mathematical and logical theory aspects of measuring or modeling (mathematical sense) two-dimensional space. A computational example is also provided.

The conventional formula to measure or model two-dimensional discrete spatial density, i.e., population density or physical crowding is defined as the average number of objects (n) per unit area of space (A):

$$D = n/A \tag{1}$$

This definition has severe shortcomings since actual spatial orientation within a specified area is disregarded. As an example of this shortcoming, refer to FIG. 1 which displays three different configurations of objects or density points. In each case, the "perceived density" of the four points is obviously different. Since the number of points and area are identical in each depiction, there is a constant value of 0.25 for population density. FIG. 2 depicts geometrically the population demographer's model of population density shown for the distributions in FIG. 1. FIG. 2 shows that each point occupies four space units (such as feet); hence, population density or physical crowdedness (D=n/A) equals one object per four square feet. FIG. 2 represents the model for each depiction of FIG. 1. However, large differences in perceived physical crowding clearly exist among the three configurations shown in FIG. 1.

See the paper, F. J. O'Brien, "A Crowding Index for Finite Populations", *Perceptual and Motor Skills*, February 1990, 70, pp. 3–11, by this reference hereby incorporated herein in its entirety discloses a formula to exploit the difference shown in FIG. 2 for move accurately representing crowding. This is accomplished by taking the actual spatial orientation of objects into account. Also see U.S. Pat. Nos. 5,235,506 and 5,402,335, each incorporated herein in its entirety by reference.

This formula, referred to as the Population Density Index (PDI) (and synonymous with "Crowding Index), is as follows:

$$PDI = \frac{1}{\bar{d}} \sqrt{\frac{n}{A}} \tag{2}$$

where n = number of objects

A = the geometric area, and d = average Euclidean distance among all possible pairs of n objects.

Basically, the above proposed formula is a generalization of the bivariate Euclidean distance formula. The derivation of the proposed density formula is patterned on the well known square-root law used in the physical sciences. It may be noted in passing that PDI has the conceptual meaning:

$$\frac{\text{Average distance of one pair of points}}{\text{Average distance of all possible pairs of points}} \tag{3}$$

Assume two objects are plotted on an X, Y Cartesian coordinate system with a fixed origin O. The mathematical distance between the two objects is measurable by simple analytic geometry using the Pythagorean distance formula:

$$d_{12} = [(X_1 - X_2)^2 + (Y_1 - Y_2)^2]^{1/2} \tag{4}$$

where $(X_1, Y_1)$; $(X_2, Y_2)$ represent each object's coordinates.

If, now, we conceive of n objects, each given coordinates within the same geometric plane such as a room, it is possible to generalize the above formula to obtain an average Euclidean distance among the n objects. The average Euclidean distance of n points, considered pairwise, is given by:

$$\bar{d} = \frac{2 \sum_{i<j} d_{ij}}{n(n-1)} \tag{5}$$

where $d_{ij}$ is the Euclidean distance between any two objects. Note that for n=2 objects, $d; d_{12}$ are equivalent.

The last step in deriving a density index is to scale $\bar{d}$ to adjust for a given number of objects residing within a specific area. A proposed general formula based on the square-root inverse law for distances incorporating size of area and the number of objects is:

$$\Delta = \bar{d} \sqrt{\frac{A}{n}} \tag{6}$$

where

A = the geometric area in which objects reside, and n = the number of objects within one area.

Dimensional analysis, as well as empirical Monte Carlo simulation investigations, of Δ shows that the units are:

$$\frac{A}{\sqrt{n}}; \frac{ft^2}{\sqrt{n}} \tag{7}$$

Essentially, Δ is the average pairwise Euclidean distance among n objects scaled for a given unit area. As will become evident in the following numerical example, Δ is inversely related to the average geometric distances among n points. Calculating the reciprocal of Δ, 1/Δ will make the relationship monotonically increasing, that is, the more densely packed the objects, the higher the value of the index. This reciprocal of Δ, or 1/Δ, is arbitrarily referred to as the population density index, or PDI. The units for PDI are $$\frac{\sqrt{n}}{A}.$$

Figure 3:
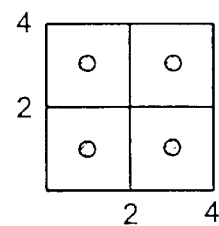
Figure 4:
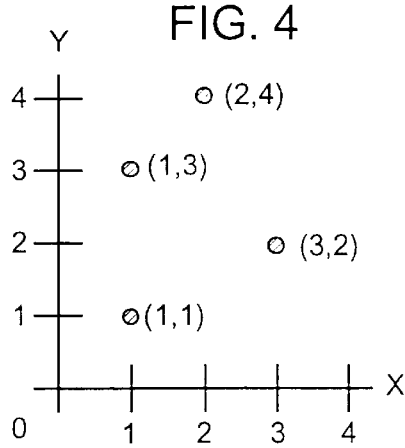
Figure 5A:
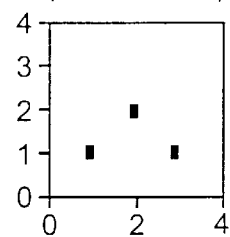
Figure 5B:
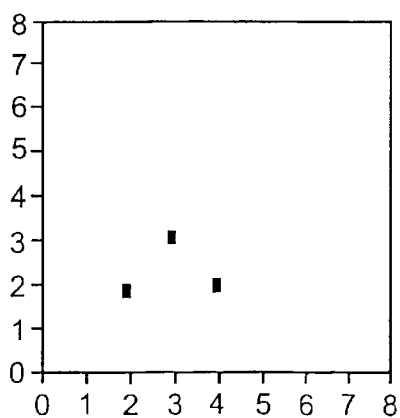

A computational example is provided with the aid of FIG. 3. For four points, there are 4×3/2=6 pairwise distances to calculate. The coordinate points for the 4 units are (1,1), (1,3), (2,4) and (3,2). The area shown is 16 units. Applying Δ, Calculating the reciprocal of Δ and multiplying by 10 to give integer results, PDI=2.3.

$$\Delta = \frac{2(d_{12} + d_{13} + d_{14} + d_{23} + d_{24} + d_{34})}{4(3)} \sqrt{\frac{A}{n}} = \sqrt{\frac{16}{4}} (2.22) = 4.4 \tag{8}$$

The Δ index appears to be valid even when areas differ by a large amount. To demonstrate this, consider FIGS. 4A and 4B. The average Euclidean distances are identical (1.6) in each situation depicted. The smaller value of Δ in FIG. 4A (3.7) is in accord with the basic interpretation of $\Delta$, that is, the smaller the value of $\Delta$, the more densely packed are the points relative to the allowed area. The results also correspond to the intuitive notion of density.

The proposed crowding index, $\Delta$ or PDI, should be interpreted as a relative measure much like a standard deviation in statistics. The theoretical mathematical minimum value of $\Delta$ or PDI is always 0, a condition realizable with dimensionless points but not realizable with solid objects such as people.

The maximum value depends on the number of objects and the geometric area. Beyond three or four objects, it becomes difficult and perhaps meaningless to attempt calculating a precise maximum value of $\Delta$ or PDI. For these reasons, hypothetical minimum and maximum bounds of the PDI formula are derived below and presented as an integral component of the disclosure of the last named application in the section "cross-reference" above. Three additional properties derived from the square-root law for average distances of $\Delta$ or PDI appear to be critical to the usefulness and interpretability of the index: 1) for constant area, PDI varies directly with the number of objects; 2) for a constant number of objects, PDI varies indirectly with area; and 3) for a constant number of objects and constant area, PDI varies indirectly with distance. Small sample Monte Carlo simulations performed by the inventor have supported these square-root properties for the PDI formula. The values of PDI computed from randomly selected uniform distributions correlated 0.96 with the conventional formula for population density (n/A). In addition, the PDI formula can be evaluated on three key scientific criteria. First, the model is very simple. It connects population density to three key variables—distance, number of points and area—through an equation that can be readily calculated. Second, the formula is justified by mathematical analysis. The inverse square-root properties of the index stated as conjectures are very reasonable and provide a context for prediction and explanation of observed results. Monte Carlo simulations support each conjecture, thereby providing preliminary justification until large scale simulations can be conducted. Third, the formula has been tested and verified by empirical research. The use of the formula in hypothetical military settings has produced results that were readily interpretable and which correlated with qualitative estimates of crowding made by independent expert observers.

The population density formula of U.S. Pat. No. 5,402,335 attempts to express differences such as those shown in FIG. 1 more accurately than the conventional population density formula. Since the index can vary widely, as indicated in FIG. 1, it was necessary to develop a new model to predict minimum and maximum bounds of the population density index values. The model was then expanded to accommodate any number of density points. Such models are discussed in U.S. Pat. No. 5,402,335.

Figure 1C:
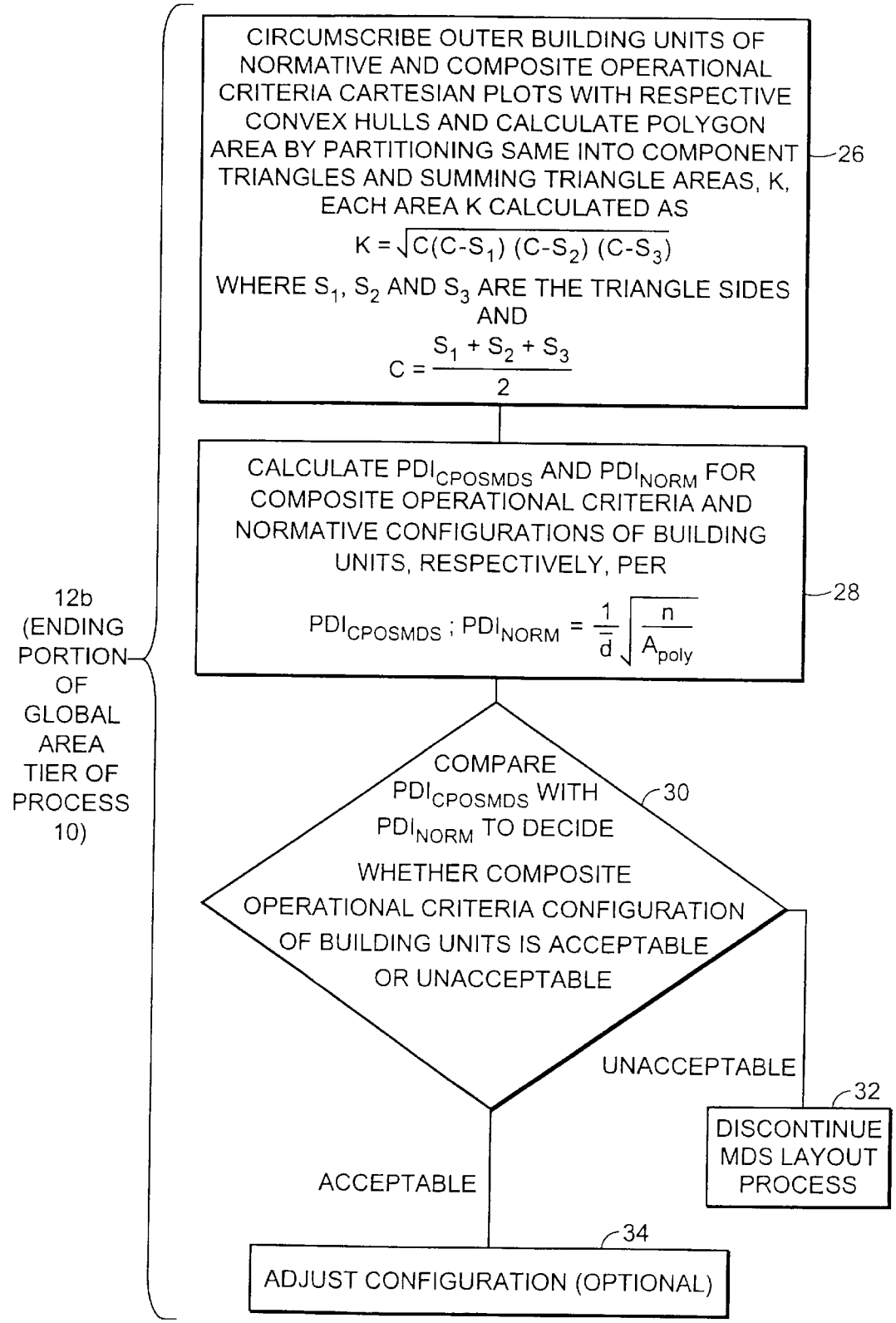
Figure 1D:
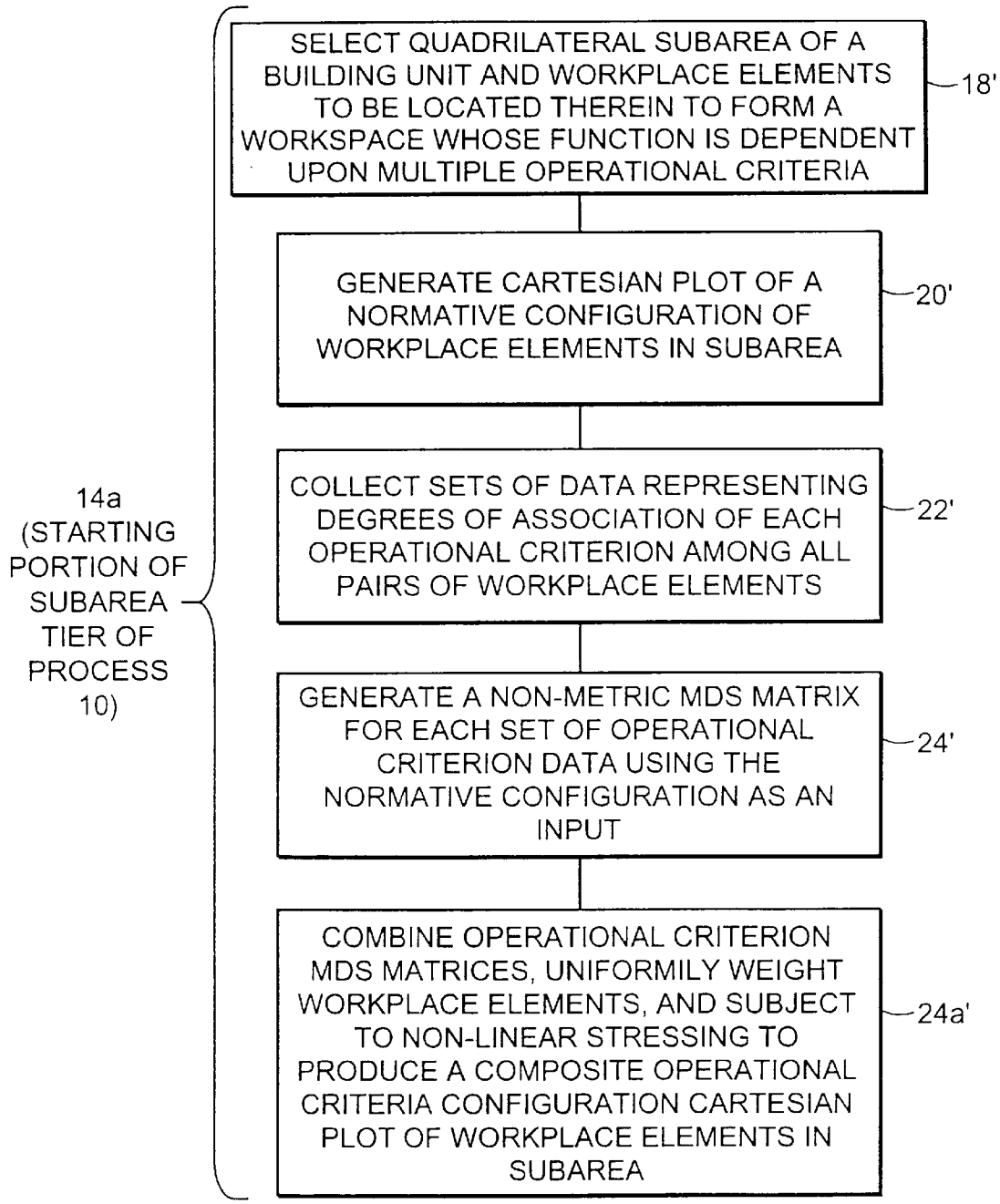
Figure 1E:
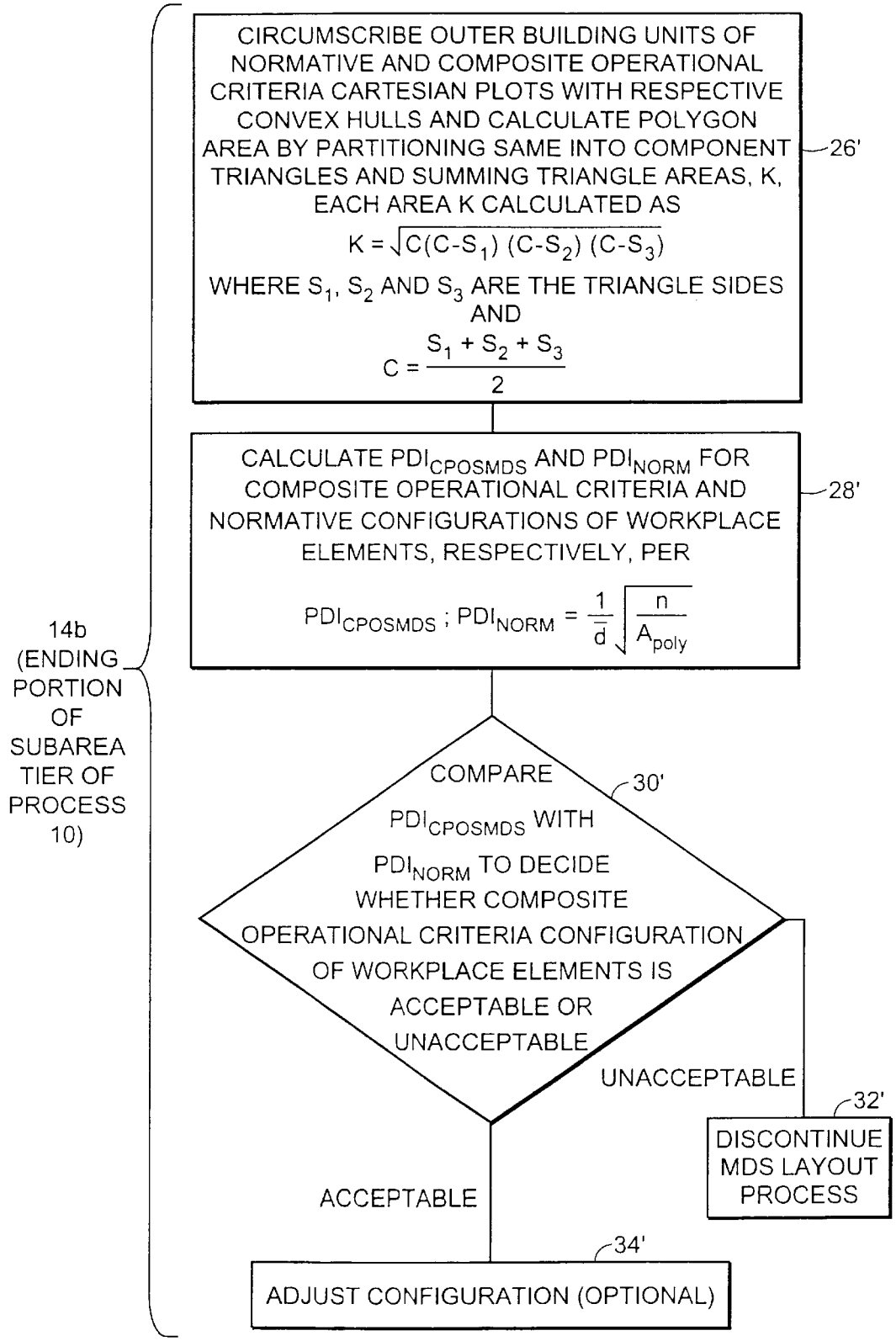
Figure 2:
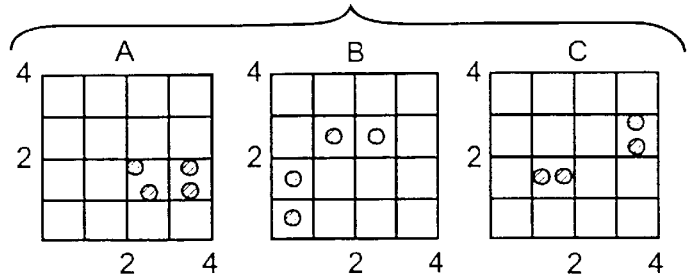
FIGS. 2, 3, 4, 5A and 5B are diagrammtics useful with respect to a hereinafter presented discussion of mathematical and logical theory underlying the measure of crowdedness in employee in the process of FIGS. 1A–1F.
Figure 6A:
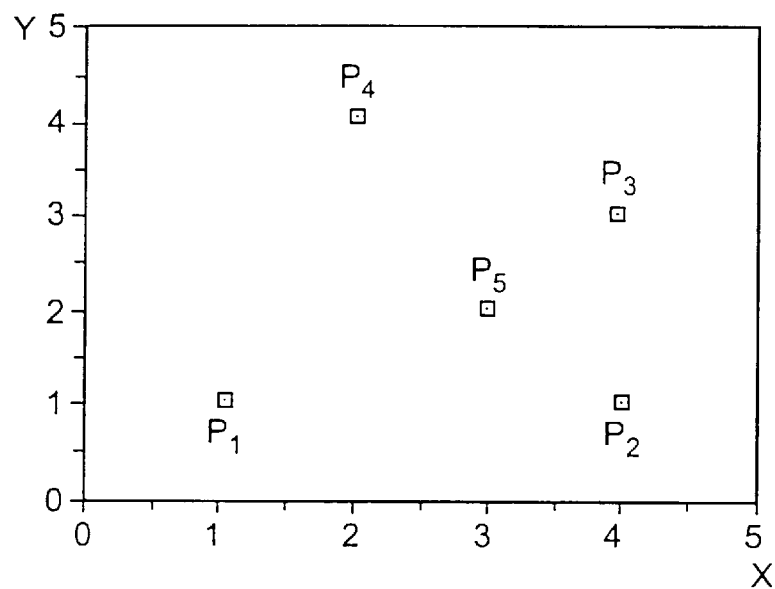
FIGS. 6A and 6B are diagrammatics useful in understanding process steps 26 and 26' in FIGS. 1C and 1E respectively.
Figure 6B:
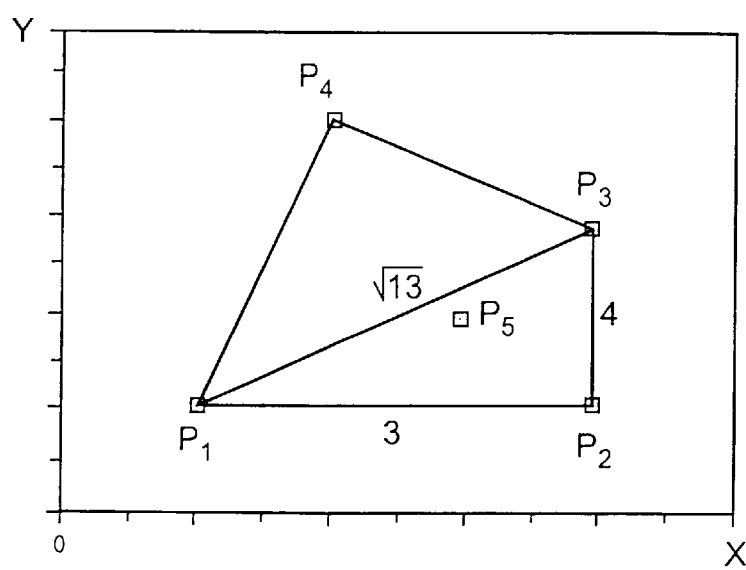

Referring now to FIGS. 6A and 6B, in accordance with the present invention a novel form of population density index (PDI) is employed in the group of facility layout process steps 12b, FIG. 1C, and in the group of subarea process steps 14b, FIG. 1E. This novel form of PDI is calculated using the polygon area of a convex hull (the word "hull" being use in its mathematical sense as a geometric structure formed by linear segments connecting the perimetrical, or outer points of a configuration of points). In the present discussion, wherein it is treated on a generalized basis it is represented by the symbol PDIpoly. Hereinbelow where it is discussed relative to specific forms of its in groups of process steps 12b and 14b it is variously represented by the symbols $PDI_{CPOSMDS}$, $PDI_{NORM}$, $PDI'_{CPOSMDS}$ and $PDI'_{NORM}$.

Reference is now made to FIG. 6A which represents a quadrilateral area containing a configuration of five density point $P_1$ through $P_5$, representing the centeroid of building units or workplace elements in the context of process 10. Referring now to FIG. 6B, a convex hull having four sides, S, may be visualized as an elastic band wrapped around the outer or perimetrical pins of a configuration of pins occupying the positions of set of point $P_1$ through $P_5$.

In accordance with the present invention, the quantity, $A_{poly}$, of the convex hull calculated by a formula based on span measure interrelationships among the building units or workplace elements represented by points $P_1$, $P_2$, $P_3$ and $P_4$, FIG. 6B. The following steps are applied:

(1) Connect the points to form a convex hull, as described above.

(2) Partition the convex hull into mutually exclusive component triangles, such that compositely the partitioned triangles overlap the convex hull.

(3) Measure lines representing sides of the component trianges.

(4) For each component triangle compute its area, K.

(5) Sum the measures of K to get $A_{poly}$.

FIG. 6B demonstrates the first three steps based upon the configuration of points of FIG. 6A (coordinates now assumed to be unknown). Two triangles can be formed from the convex hull circumscribed over points $P_1$, $P_2$, $P_3$ and $P_4$. It will be appreciated that the general rule is that $n_p-2$ component triangles will result from a convex hull consisting of $n_1$ boundary, or perimentrical points. K is calculated for each of the component triangles using the formula $$A_k = \sqrt{(c-s_1)(c-s_2)(c-s_3)} \tag{8a}$$

where $s_1 s_2$, and $s_3$ are lengths of the triangle's side, and c is the triangle's semiperimeter of the triangle, namely $$c = \frac{s_1 + s_2 + s_3}{2}. \tag{8b}$$

Then $A_{poly}$ is obtained as follows $$A_{poly} = \sum_{i=1}^{n} k_j \tag{8c}$$

$PDI_{poly}$ is calculated as follows:

$$PDI_{poly} = \frac{1}{\bar{d}} \sqrt{\frac{n}{A_{poly}}} \tag{8d}$$

where
 n=the number of objects in the configuration, and
 $\bar{d}$=average Euclidean distance among all possible pairs of points.

Insofar as the invention is presently understood, the calculation of density aspect of the PDI formula on the basis of the polygon area, $A_{poly}$, bounded by the convex hull takes into account the actual spatial distribution of the objects and thereby provides a more accurate calculation of population density than simply the area of the quadrilateral space which is the basis of the calculation in above identified abandoned, but available to the public, U.S. patent application Ser. No.

07/754,779 filed Aug. 30, 1991, and other references list in the hereinabove "Description of the Prior Art" section. This conclusion tends to be corroborated by a newer trend of thought in the "human factors" disciplines of engineering, namely that self adjustment responses to crowdedness or congestion by humans at their work stations is more related to the relative position of other workplace elements (personnel/equipment) than to the bounds of the workplace. Stated another way, it is thought that there is an intrinsic human behavior characteristic for individuals to cluster together away from the boundaries of their facility or workspace area, as they adapt to required operational criteria.

The primary density metric employed in conjunction with process 10 is a normative population density index, $PDI_{norm}$ or $PDI'_{NORM}$ depending upon whether used in group of process steps 12b or 14b, respectively. It is calculated by the equation:

$$PDI_{NORM}; PDI'_{NORM} = \frac{1}{\overline{d}}\sqrt{\frac{n}{A_{poly}}}. \quad (9)$$

quadrilateral area (global area/subarea) by the layout analysts, based a human intuitive response to knowledge of the function and human activity occurring in the quadrilateral area. More specifically the planner forms a convex hull out of the perimetrical or outer points (centeroid of objects). The average inter-object distance, $\overline{d}$, and polygon area, $A_{poly}$, are computed, and the value produced by equation (9) is deemed the normative population density index, $PDI_{NORM}$. Preferably, $PDI_{NORM}$ is derived from an experimental configuration which is the best available human judgment, or combinations of human judgments. Typically, it is selected by the concerted effort of a skilled layout planner and client, or client's representative, who through experience developed knowledge and/or experience involving of the facility/workspace function, and has a keen awareness of inter-object requirements. The person, or combination of persons, providing this best human judgment is hereinafter, and in the appended claims sometimes referred to as the "expert".

References is now made to FIGS. 7, 8, 9A and 9B. The present and succeeding nineteen (19) paragraphs constitute a discussion of the mathematical and logical theory relating to bounds and other properties of $PDI_{NORM}$, including computational examples.

As will become apparent in connection with the description of the details of group of product steps 12b and 14b, $PDI_{norm}$ is a critical parameter in producing layouts of building units and workplace-elements in accordance with the present invention.

Reference is now made to the above-identified abandoned, but publicly accessible U.S. patent application Ser. No. 07/756,264, filed Aug. 30, 1991, which is hereby incorporated by reference. With respect to the method of that invention, firstly, it is to be understood that it is postulated with a sample size of density points and geometric area of interest, the points are plotted in a uniform lattice. That is, a two dimensional grid, distribution, in a checkerboard arrangement with every consecutive horizontal and vertical point being equidistant. Secondly, using this plotted distribution, two theoretical indices are calculated—a lower bound density index and an upper bound density index. Thirdly, the data regarding personnel and/or equipments which are the subjects of the layout are collected and the population density index values are calculated. Parenthetically, the latter abandoned, but accessible to the public, patent application presents a mathematical proof that a density metric actual PDI ($PDI_{act}$)therein (which correspond to the "norm" PDI ($PDI_{norm}$) herein) is bounded by minimum and maximum PDIs. Fourthly, the "effective inter-point distance" index is calculated based on the actual population density index values, and the research findings are compared to the model indices.

The process disclosed in that abandoned application include at least two process steps involving different "models" of experimental configurations. This feature of a two-step model in that process allows an evaluation of the different layout solutions explored as part of a given layout task, and enables comparisons with solutions provided in connection with other layout tasks. In the second step, the lattice or uniform distribution is an effective visual aid for demonstrating how population density changes with dynamic human or equipment positioning being relocatable at will.

In the second step, the lower bound of the population density index can be calculated for any uniform arrangement of points. The lower bound is based on a lattice of the integers called a "unit lattice". In general, a unit lattice means a uniform distribution of n points in area A such that n=A. This implies that the inter-point distance of consecutive horizontal and vertical points is always equal to 1. A non-unit lattice will mean that n and A are not equal. In the special cases of n=2 and n=3 objects, "unit lattice" means either a unit line segment (n=2) or, for n=3, a Euclidean equilateral triangle (perimeter=3 units), each constructed in the interior of $\Delta$. A linear dimension is herein designated in feet.

Figure 7:
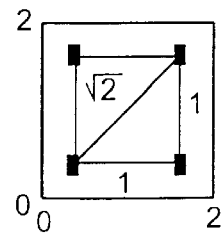
FIGS. 7, 8, and 9A–9D are diagrammatics useful with respect a hereinafter presented discussion of mathematical and logical theory related to one of the critical parameters $PDI_{NORM}$ employed in calculations performed in the process depicted in FIG. 1.

FIG. 7 depicts of a 2×2 unit lattice. Note that the area is 4 ft² and that the number of points is 4, or n=A. The horizontal and vertical distance between each of the consecutive points is equal to 1. This is derived from a simple relation that provides inter-point distances of lattices. Namely, if $\delta$ denotes the inter-point distance, then $$\delta = \sqrt{4\frac{ft^2}{4}} = 1 \quad (10)$$

where $\delta$ is in feet.

The above example illustrates the approach that is used for approximating inter-point distances for any lattice of n points uniformly distributed in area A. The general formula to do this is given by:

$$\delta = \sqrt{\frac{A}{n}} \quad (11)$$

The next step, calculating the average Euclidean distance of all possible pairs of points in FIG. 5, is given by:

$$\overline{\Delta} = \frac{1+1+1+1+\sqrt{2}+\sqrt{2}}{6} = 1.14 \quad (12)$$

The average Euclidean distance for a unit lattice is called $\overline{\Delta}$ to distinguish it from the general Euclidean distance given by $\overline{d}$ in the general population density index formula:

$$PDI = \frac{1}{d}\sqrt{\frac{n}{A}} \qquad (13)$$

The reference parameter "lower bound estimate of the index for a non-unit lattice" can now be derived. (Note that this reference parameter is a hypothetical concept). It will be appreciated that this is prior to conducting the density analysis. At that time, an analyst involved with density of a layout will have collected data providing a knowledge of the number of points in the area, but the expected lower bound Euclidean distance will not be known. The known average inter-point distance relationship of equation:

$$\delta = \sqrt{\frac{A}{n}} \qquad (14)$$

is used to calculate the average Euclidean distance for any non-unit lattice with the same number of points as the unit lattice distribution. The formula to calculate the average Euclidean distance associated with the minimum density ($\overline{d}_{min}$) is given in the following equation:

$$\overline{d}_{min} = \overline{\Delta}\sqrt{\frac{A}{n}} \qquad (15)$$

That is, each coordinate point in the unit lattice is scaled by a constant, equal to δ in equation:

$$\delta = \sqrt{\frac{A}{n}} \qquad (16)$$

to calculate the lower bound of the average Euclidean distance.

Thus, the lower-bound model of the population density index is obtained by replacing d in the general population density index formula:

$$PDI = \frac{1}{d}\sqrt{\frac{n}{A}} \qquad (17)$$

by $\overline{d}_{min}$ in equation:

$$\overline{d}_{min} = \overline{\Delta}\sqrt{\frac{A}{n}} \qquad (18)$$

and simplifying. The result is the lower bound ($PDI_{min}$):

$$PDI_{min} = \frac{1}{\overline{\Delta}}\frac{n}{A} \qquad (19)$$

Figure 8:
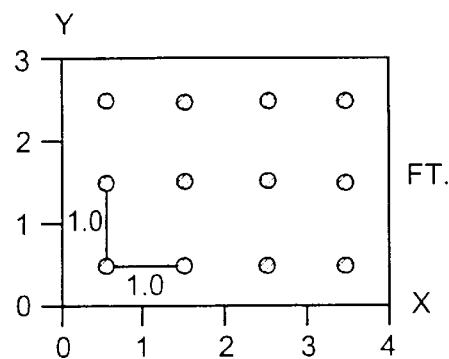

To provide an example of calculating the population density index lower-bound ($PDI_{min}$), assume a study is being conducted on 12 people. Also assume the area involved in the study is a square with area of 25 ft². There are two logical choices in the selection of a unit lattice of 12 points: 4×3 and 6×2 or equivalently 3×4 and 6×2. A unit lattice of 4×3 or 3×4 will provide an excellent estimate of the lower-bound value of the index for this square. The only other logical choice for a uniform distribution of 12 points is the unit lattice 6×2 or 2×6; however, with this choice, the 12 points cannot be accommodated into a 5-ft.×5-ft. area with inter-point distance δ=1.4. FIG. 8 shows the 4×3 unit lattice. $\overline{\Delta}$ can be calculated using equation 46, below. Thus, the lower bound population density index based on equation:

$$PDI_{min} = \frac{1}{\overline{\Delta}}\frac{n}{A} \qquad (20)$$

is (1/1.90) (12/25), which is approximately equal to 0.25. The population density index can be no smaller than 0.25 units in a lattice distribution consisting of 12(4×3 unit lattice) points and area 25 ft² with inter-point distance of about 1.4.

The calculation of the upper bound of the index is based on a further assumption. It is assumed that there is a minimum (non-zero) inter-point distance between any two neighboring points in a uniform distribution corresponding to some practical lower limit of elbow room allowable between persons. The distance value selected will correspond to a lattice distribution that produces the maximum population density index value for the given number of objects and area in a layout task. Selecting the minimum inter-point distance is empirical. To exemplify the derivation, assume that 1 ft is the minimum value. As is widely accepted by persons skilled in the art to which the present invention pertains, this distance might correspond to the nose-to-nose distance of two persons positioned shoulder-to-shoulder. Other values of minimum inter-point distance, appropriate to the circumstances of the functional organization involved in a given task at hand of laying out objects, are to be selected by the layout analyst employing this invention. Then the task worker computes it as a reasonable value to choose based on the known opinion of experts. Other values could be chosen by this analyst who could derive personally upper bounds for the population density index using the derivation that follows.

The assumption that 1 ft is the practical minimum inter-point distance translates into δ of δ=(A/n)^(1/2) being set to 1.

From this, it follows from the generalized average Euclidean distance equation:

$$\overline{d}_{min} = \overline{\Delta}\sqrt{\frac{A}{n}} \qquad (21)$$

that the upper bound of the average Euclidean distance ($\overline{d}_{max}$) is:

$$\overline{d}_{max} = \overline{\Delta}\sqrt{\frac{A}{n}} = \overline{\Delta} \qquad (22)$$

Substituting equation:

$$\overline{d}_{max} = \overline{\Delta}\sqrt{\frac{A}{n}} = \overline{\Delta} \qquad (23)$$

into the general population density index formula:

$$PDI = \frac{1}{d}\sqrt{\frac{n}{A}} \qquad (24)$$

gives the upper bound:

$$PDI_{\max} = \frac{1}{\overline{\Delta}} \sqrt{\frac{n}{A}}. \qquad (25)$$

Equation $$PDI_{\max} = \frac{1}{\overline{\Delta}} \sqrt{\frac{n}{A}} \qquad (26)$$

gives the expected reference parameter "upper bound of the population density index in a lattice" distribution (which is a hypothetical concept) assuming a 1-ft distance as the practical minimum value of inter-point elbow room. From the earlier example where n=12 objects and area=25 ft², $PDI_{max}$ is equal to:

$$PDI_{max}=(1/1.90)(12/25)^{1/2}=0.36. \qquad (27)$$

That is, density can be no larger than 0.36 units when the 12 density points are distributed uniformly with a one foot distance between each horizontal or vertical point.

In general, if the selected inter-point distance is some arbitrary constant c, then $PDI_{max}$ is:

$$PDI_{\max} = \frac{1}{c\overline{\Delta}} \sqrt{\frac{n}{A}} \qquad (28)$$

For example, if 1 in. is the selected value for c, then the maximum population density index value is $$PDI_{max}=12(1/1.90)(12/25)^{1/2}=4.38. \qquad (29)$$

The final index provided by the model is called the actual effective inter-point distance or $\delta_{eff}$. The effective inter-point distance index translates the clustering of n points observed in an actual study into a lattice distribution for which an hypothetical inter-point distance, or effective inter-point distance can be determined and compared with the theoretical maximum inter-point distance of uniform dispersions in non-unit lattices provided by equation:

$$\delta = \sqrt{\frac{A}{n}}. \qquad (30)$$

The utility of this comparison resides in the fact that $\delta_{eff}$ varies in accord with the relation $1 \leq \delta_{eff} \leq \delta$.

The effective uniform—distance index can be derived as follows. A generalized version of equation (30) provides the average Euclidean distance for any lattice. For $\overline{d}_{min}$ equation (22) is calculated directly. For $\overline{d}_{max}$, $(A/n)^{1/2}$ is set equal to some hypothetical constant (such as 1). Now, a reference parameter "inter-point distance" such as $\delta=(A/n)^{1/2}$ can be conceived theoretically as a variable number for any population density index value in a study with n persons and area A. An inter-point distance such as δ is strictly determined by the average Euclidean distance and vice versa. Hence, the following equation expresses the hypothetical relationship between the actual Euclidean distance $d_{act}$ of an observed population density index value and another reference parameter $\delta_{eff}$.

$$\overline{d}_{act} = \overline{\Delta}\delta_{eff} \qquad (31)$$

solving for δ gives:

$$\delta_{eff} = \frac{\overline{d}_{act}}{\overline{\Delta}} \qquad (32)$$

From the earlier discussion, it is obvious that $\delta_{eff}$ expresses the ratio of the actual PDI relation to the maximum PDI and expresses it in a average inter-point distances. Equation (32) can be stated explicitly in terms of the norm population density index ($PDI_{norm}$) of the general population density index formula (equation (33) hereinabove):

$$\delta_{eff} = \frac{1}{PDI_{norm}\overline{\Delta}} \sqrt{\frac{n}{A}} \qquad (33)$$

Either equation (32) or equation (33) provides the effective inter-point distance in a population density study. To illustrate the concept of effective inter-point distance, assume that in the example described earlier with 12 persons in an area of 25 ft² (refer to FIG. 9C), that the calculated norm PDI value ($PDI_{norm}$) is 0.30. If a uniform distribution of the 12 points is constructed, the inter-point hypothetical uniform distance that preserves the actual average Euclidean distance $\delta_{eff}$ based on equation (33) is equal to (1/0.30) (1/1.90) $(12/25)^{1/2}=1.2$ ft.

Figures 9A, 9B, 9C, 9D:
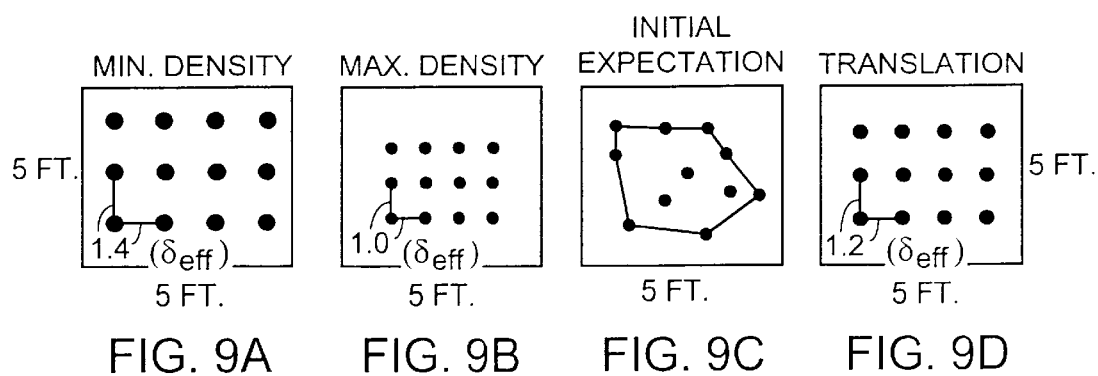

That is, a population density index value of 0.30 means that the 12 persons can be arranged theoretically in a uniform distribution such that the hypothetical inter-point uniform distance is about 1.2 feet. This value can be compared with $$\delta_{eff} = \sqrt{\frac{25}{12}} \approx 1.4 \qquad (34)$$

which corresponds to the hypothetical inter point maximum uniform dispersion of 12 persons in a 25 ft² area. When this is done, the percent increase in density associated with a population density index of 0.30 is approximately 20 percent (1.2 vs 1.4ft). In summary, $\delta_{eff}$ gives a useful (visual) mathematical summarization of discrete spatial density, translated into terms of uniform inter-point distance language. FIGS. 9A–9D are diagrammatic depictions representing the employment of actual effective inter-point distance $\delta_{eff}$ as a model to visualize the translation of mathematical summarizations of discrete density into terms of inter-point distances. To collect all of the information contained in the model, these four figures are presented as a summary for the example employing 12 persons within an area of 25ft². The assumptions and findings for this example were as follows. First, n was selected as 12 and the area was 25 ft². Secondly, a unit lattice of 4×3 was determined to be appropriate for the calculation of the unit lattice Euclidean distance $\overline{\Delta}$ (1.90, see FIG. 8). In the third step of the model, lower and upper bounds of the population density index were calculated to be 0.25 and 0.36 units, respectively. The lower and upper bounds of the index were shown to be describable in terms of uniform inter-point distances. In the examples, those values are 1.4 (FIG. 9A) and 1.0 (FIG. 9B) feet for the lower and upper bounds, respectively. It was then demonstrated how to translate the $PDI_{norm}$ value into a uniform inter-point distance using equation (11). The data points with a $PDI_{norm}$ value of 0.30 (FIG. 9C) were then translated into a uniform distribution of points ("effective distance" which as calculated to be 1.2 feet (FIG. 9D).

Figure 10:
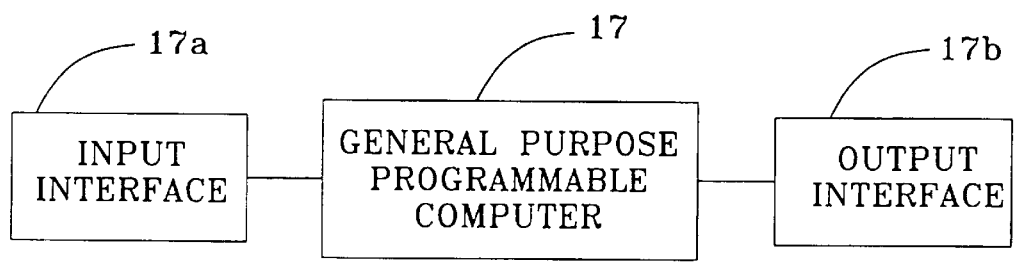
FIG. 10 is a schematic of a computer employed in performing the processes of FIGS. 1A–1F.

The present and succeeding paragraphs describe the functions that a computer program using non-metric multidimensional scaling (MDS) algorithms perform in the practice of process 10. The inputs to a suitable general purpose programmable computer 17, FIG. 10, operating under control of an MDS algorithm program are preferably a single matrix representing an initial experimental, two dimensional, Cartesian plot of a configuration of building units located in the quadrilateral global area selected to receive the building units of a facility, and a set matrices representing degrees of association among all possible pairs of these building units for various inter-building operational criteria associated with the function the facility performs. (For examples of such operational criteria were refer to the earlier overview description of process 10 which was provided in connection with FIGS. 1A–1F). Briefly, the MDS algorithm computer program which is executed by computer 17, performs a transformation of the initial experimental configuration of the building units into an output Cartesian plot of a configuration of the building units which is nearly optimized in its composite performance of the various inputted operational criteria. A figurative analogy (simplified only one set of operational criteria data) would be the MDS algorithm receiving as it inputs someone's best guess of a two-dimensional Cartesian plot of places in city which are frequent pairs of termini of taxi trips, and a table of amounts of fare paid for such trips (operational criteria data). Using the experimental plot and the data, the NDS algorithms would convert even a grossly distorted initial inaccurate plot into an output plot with accurate relative geographic locations of the places.

As earlier mentioned it is preferred that the initial experimental configuration of building units in the quadrilateral designated facility site be produced based on an intuitive "expert's" (as defined above) response to knowledge of the function served by the facility. It is to be appreciated that optionally the MDS algorithm could function with plural different experiment plots being processed and/or with different set of operational criterion data that are poor or even arbitrary. The data of the experimental configuration and the sets operation criteria data must be conventionally translated into compatible matrix sets using a suitable software program executed as a preprocessing operation by the general purpose programmable computer 17, FIG. 10. Appropriate inter-building units operational criteria data is identified from an analysis of the facility's function, and then collected by such techniques as extraction from records of facility operation, desk audits, time and motion type studies and time-lapse photography. Each set of data is translated into matrix expressions of degrees of association of the individual operational criteria between all possible pairs of building units of the configuration. The set of building units of configuration are preferably uniformly weighted, and represented in the plot as symbolic points (zero dimensional abstract points).

The matrix set are then introduced into the computer through the computer's input interface 17a. The MDS software algorithms individually combine the experimental configuration matrix of data with each respective matrix representing a set of inter-building unit degrees of association of a operational criteria, producing a set of non-metric, building-unit and operational criterion MDS matrices. The MDS algorithm program then combines all the matrices of this set into a composite-facility-operational-criteria-Cartesian-configuration-of-building units; preferably using a non-linear, least-square stressing function. The algorithm in effect follows a progression of matrices operations starting with an operation upon adjacent matrices, an then operation on compatibility matrices and finally an operation upon similarity or "distance" matrices. What is happening is a measurement of a "badness of fit" interacts with a measure of composite operational criteria, in a way that causes a decrease of the stress function. "Distances" (as mentioned earlier in an abstract senses) are taken to be the measures or metrics of the operational criteria, in such a way that the highest matrix score for any pair of objects represents a strong requirement that they be placed close together, and the lowest score indicates least importance in proximate locations. The MDS algorithm software is applied first for building units in the global area for grouped process steps 12a and 12b, and then for workplace elements in one or more subareas within the building units, groups of process steps, 14a and 14b.

Typically, after between 20 and 50 iterations of computer 17 executing the MDS algorithm and producing the composite-facility-operational-criteria-Cartesian-configuration-of-building units, a suitable stopping criteria related to gradient of stress decrease and/or magnitude of the gradient is reached. At that time the then coordinates of the objects represent a near optimum spatial layout from the viewpoint of operational criteria emerge from the computer output interface 17b, and employing any suitable computer driven plotter (not shown) connected to output interface 17b a printed plot of the global area or subarea showing the machine recommended location of each object is presented for consideration. The final solution is one that has a minimum "stress value".

Any of various will known of-the-shelf computer programs for implementing MDS algorithms may be employed. The Matrix Laboratory (MATLAB) software product can be conventionally adapted for MDS algorithms. It is produced by Matworks, of Cambridge Mass. is one suitably set of programs. A well known existing package program is "KYST" which is described and discussed in the below identified papers of Kruskal.

Further details regarding the methodology of employing MDS algorithm computer program see A. T. Siegel, J. J. Wolf and J. Pilitis (1982), "A New Method for the Scientific Layout of Workspace". Applied Ergonomics, 18(2) 87–90; Kruskal, Non-Metric "Multidimensional Scaling; A Numerical Method", Psychometrica, Vol. 29, No 2, June 1994; and Kruskal "Multidimensional Scaling by Optimizing Goodness of Fit to a Non-metric Hypothesis:, Psychometrica, Vol 29, No. 1 (1964), all of which are by these present references incorporated herein in their entirety.

This plot serves as preliminary solution layout so that the layout planner may then, at the planner's discretion, make a series of minor manual adjustments to the computer-generated solution. Such adjustments may be desirable to compensate for special needs such a repair access or for physical constraining features of the area such as the location of posts, stairways, and doorways, in the existing area. Accordingly, the multistage method of the step two in the exemplary description provides for the exercise of workspace-user judgments as well as consideration of work imposed conditions. Accordingly, this regard process 10 is computer aided, rather then computer generated. The computer offers an initial solution followed by a manual adjustment.

In summary, the output data produced by computer 17 processing the input data by the execution of the MDS algorithm software reveals the underlying structures in data sets and then presents them in a graphic format, i.e., a geometric configuration/mapping, suitable for visual analysis and interpretation.

With this background, the sequence of steps in the practice of process 10 will be described in connection with flow charts of process steps in FIGS. 1A–1F. In steps 18, 20 and 22, FIG. 1B, selection of the quadrilateral global area and set of building units, generation of an expert's normative configuration of the building units in the global area, and the collection of operational criteria data are performed, or obtained, by the layout analyst. In step 24, a set of non-metric, multidimensional scaling (MDS), building units and operational criterion matrices are generated following the MDS algorithm methodology (as hereinbefore described in detail), and in step 24a this set of matrices is combined into a composite-facility-operational-criterion-Cartesian-configuration-of-building units (again following MDS algorithm methodology hereinbefore described in detail). In step 26, convex hulls are circumscribed about both (i) the expert's normative experimental configuration and (ii) the facility-operational-criteria-configuration-of-building units and each respective polygon areas, $A_{poly}$, of the polygon within the respective convex hulls is calculated using Equation 8a. In step 28 calculation of composite-facility-operational-criteria-MDS-matrix-population-density-of-building units, $PDI_{CPOSMDS}$, is performed employing general purpose programmable computer 17, FIG. 10, using equation 9 embedded in a software routine implementing the step. This index constitutes a measure of the crowdedness of the resultant configuration of building units after MDS methodology repositioned the locations of the building units to provide least stress in enabling the facility to compositely performance the operational criteria. Also as part of step 28, a corresponding normative-population-density-index $PDI_{NORM}$ of the initial experts configuration of the building units is calculated using equation 8b similarity embedded in a routine which is executed by computer 17, FIG. 10, and implementing the step. In step 30 $PDI_{CPOSMDS}$ is compared with $PDI_{NORM}$, providing the layout analyst with a qualitative indication of the impact upon crowdedness of the readjustment of the experts initial configuration by MDS methodology. The higher the value of PDI index the more crowdedness exist in the configuration. The analyst can thereby quantitatively consider whether the facility-operational-criteria-building units-configuration is acceptable relative to the expert's normative experimental configuration by observing the ratio of the values. For example, if $PDI_{CPOSMDS}$ is one-half of the $PDI_{NORM}$, the resulting ratio 2.0 would indicate the MDS methodology not only reduced stress in the performance of the operational criteria, but also significantly reduced crowdedness. With these circumstances it is likely that MDS methodology induced configuration would be acceptable to the layout analyst's client. If desired, an arbitrary low threshold value of the ratio may be used and the step automated. Facility operational-criteria-building units-configurations having unsatisfactory $PDI_{CPOSMDS}$ indices result in discontinuing the MDS layout process, step 32. Where configuration is acceptable optional manual adjustments are made, as for example, to overcome physical constraints, step 34.

Passing to the tier of process 10 for the layout of workplace elements personnel workstations and equipments) in one or more quadrilateral subareas of a building units or units, process steps 18', 20', 22', 24a', 26', 28', 30', 32' and 34', FIGS. 1D and 1E are performed utilizing workspace operational criteria data instead of facility operation criteria.

In the event the MDS methodology induced facility layout and one or more workplace layout are confirmed by $PDI_{poly}$ comparison, the project effort may proceed to ultimate construction of the building units in locations within the global area and construction and fitting out of workplace elements with one or more subareas, step 36, FIG 1F, in accordance with facility and workspace operational-criteria-building units-and-workplace-elements configuration solutions provided by process 10.

It will be appreciated by those skilled in the art that various process step or combinations of process step in addition to those identified with the MDS algorithm methodology can be implemented by using a suitably programmed general purpose computer.

Many modifications of the presently disclosed invention will become apparent to those of skill in the art without departing from the inventive concepts.

What is claimed is:

1. A method which is a combination of steps, including computer implemented steps, for producing a layout of a facility comprising a plurality of building units, said facility serving a function which is dependent upon performance of activities by live occupants of the facility which define a plurality of facility operational criteria, said layout to be a candidate in an attempt to optimize positioning of the buildings in a ground site in accordance with the joint criteria of effective performance of said function and least crowdedness, said method comprising the steps of:

selecting a quadrilateral global area of a predetermined ground site;

selecting a set of n building units;

generating at least one experimental-Cartesian-configuration-of-building units in the global area without using the population density index (PDI) crowdedness assessment methodology;

collecting at least first and second sets of matrices of data representing degrees of association of a corresponding at least first and second individual facility operational criteria among all possible pairs of building units, said operational criteria including at least one criterion from the class of criteria consisting of (I) an inter-building-unit transition frequency matrix, (II) a sequential activity dependencies matrix, and (III) a shared used of building units matrix, and further said data being collected by at least one of the collection methodologies from the class of such methodologies consisting of (i) analysis of activities of the facility operation, (ii) desk audits, (iii) time and motion studies, and (iv) time-lapse photography;

generating, through the employment of computer implemenation, a corresponding at least two non-metric, multidimensional scaling (MDS), building units and operational criterion (MDS) matrices, each building units and operational criterion MDS matrix being generated by combining a matrix of data based on a one experimental configuration of said at least one experimental-building units-configuration and a matrix of data representing degrees of association of the corresponding facility operational criterion among respective possible pairs of building units in accordance with MDS methodology;

generating, through the employment of computer implementation, a composite-facility-operational-criteria-Cartesian-configuration-of-building units representing a statistical optimization of building unit locations responsive to said at least first and second facility operational criteria, the generation of said facility-operational-criteria-Cartesian-configuration of building units including combining the at least two building units and operational criterion criterion MDS matrices using an iterative non-linear stress function with all of the building units involved in this combining step uniformly weighted, to thereby determine a layout of buildings in said global area which represents a fit of least badness of building layout, with the objective of effectively performing said activities;

circumscribing the n building units of said facility-operational-criteria-configuration-of-building-units with a first convex hull, and circumscribing said one experimental configuration with a second convex hull;

calculating, through the employment of computer implementation, the respective polygon area, $A_{poly}$, of the first and second convex hulls, the calculation of $A_{poly}$ for each convex hull including (i) partitioning same into $n_p-2$ component mutually exclusive component triangles which compositely overlap the convex hull, where $n_1$ is the number of perimetrical building units along the convex hull and (ii) calculating the area, K, of each component triangle according to the equation $$K = \sqrt{c(c-s_1)(c-s_2)(c-s_3)}$$

where $s_1$, $s_2$, and $s_3$ are the lengths of the sides of a component triangle and $$c = \frac{s_1 + s_2 + s_3}{2}$$

and (iii) summing all the areas K of the $n_p-2$ component triangles;

calculating, through the employment of computer implementation, a composite-facility-operational-criteria-MDS-matrix-population-density-of-building units-index, $PDI_{CPOSMDS}$, based upon the polygon area, $A_{poly}$, of the first convex hull, and calculating, through the employment of computer implementation, a normative-population-density-index-of-the-configuration-of-building units-circumscribed-by-the-second-convex-hull-index, $PDI_{NORM}$, based upon the polygon area, $A_{poly}$, of the second convex hull, said calculations being made using the relationship $$PDI_{CPOSMDS}; PDI_{NORM} = \frac{1}{\bar{d}}\sqrt{\frac{n}{A_{poly}}}$$

where $\bar{d}$=average Euclidean distance among all possible pairs of the building units; and deciding whether said facility-operational-criteria-building units-configuration is acceptable as a candidate layout relative to said experimental configuration based upon a comparison of the density index, $PDI_{CPOSMDS}$, with the density index, $PDI_{NORM}$, and if so to print out a plot, through the employment of computer implementation, representing the locations of said buildings in said ground site according to said configuration.

2. The method of claim 1 wherein the method is further for producing a layout of a workspace in a building unit of the facility, said workspace comprising a plurality n' of workspace elements, said workspace serving a function which is dependent upon performance of activities of live occupants of the workspace which define a plurality of workspace operational criteria, said layout of workspace to be a candidate in an attempt to optimize positioning of the workspace elements in the building in accordance with the joint criteria of effective performance of said function and least crowdedness, said further method comprising the steps of:

selecting a quadrilateral subarea of a building unit;

selecting a set of n' workspace elements;

generating at least one experimental-Cartesian-configuration-of-workspace-elements in the subarea without using the population density index (PDI) crowdedness assessment methodology;

collecting at least first and second sets of matrices of data representing degrees of association of a corresponding at least first and second individual workplace operational criteria among all possible pairs of workplace elements, said operational criteria including at least one criterion from the class of criteria consisting of (I) an inter-workplace-element transition frequency matrix, (II) a sequential activities dependencies matrix, and (III) a shared use of workplace elements matrix, and further said data being collected by at least one of the collection methodologies from the class of such methodologies consisting of (i) analyses of activities of the operations of workplace elements, (ii) desk audits, (iii) time and motion studies, and (iv) time-lapse photography;

generating, through the employment of computer implementation, a corresponding at least two non-metric, multidimensional scaling (MDS), workplace elements and operational criterion matrices, each workplace element and operational criterion (MDS) matrix being generated by combining a matrix of data based on a one experimental configuration of said at least one experimental-workplace-elements-configuration and a matrix of data representing degrees of association of the corresponding workspace operational criterion among respective possible pairs of workplace elements in accordance with MDS methodology;

generating, through the employment of computer implementation, a composite-workspace-operational-criteria-Cartesian-configuration-of-workplace elements representing a statistical optimization of workplace element locations responsive to said at least first and second workplace operational criteria, the generation of said composite-workspace-operational-criteria-Cartesian-configuration including combining the at least two workplace elements and operational criterion MDS matrices using an iterative non-linear stress function computer program with all of the workplace elements involved in this combining step uniformly weighted, to thereby determine a layout of workplace elements in said subarea of the building unit which represents a fit of least badness of workplace layout with the objective of effectively performing said activities;

circumscribing the workplace elements of said workplace-operational-criteria-configuration, with a first convex hull and circumscribing said one experimental configuration with a fourth convex hull;

calculating, through the employment of computer implementation, the respective polygon area, $A_{poly}$, of the third and fourth convex hulls the calculation of $A_{poly}$ for each convex hull including (i) partitioning same into $n_p-2$ component mutually exclusive component triangles which compositely overlap the convex hull, where $n_1$ is the number of perimetrical workplace elements along the convex hull and (ii) calculating the area, K, of each component triangle according to the equation $$K = \sqrt{c(c-s_1)(c-s_2)(c-s_3)}$$

where $s_1$, $s_2$, and $s_3$ are the lengths of the sides of a component triangle and $$c = \frac{s_1 + s_2 + s_3}{2}$$

and (iii) summing all the areas K of the $n_p-2$ component triangles;

calculating, through the employment of computer implementation, a composite workspace-operational-criteria-MDS-matrix-population-density-of-workplace-elements-index, $PDI'_{CPOSMDS}$, based upon the polygon area, $A_{poly}$, of the third convex hull, and calculating, through the employment of computer implementation, a normative-population-density-index-of-the-configuration-of-workplace-elements-circumscribed-by-the-second-convex-hull-index, $PDI'_{NORM}$, based upon the polygon area, $A_{poly}$, of the fourth convex hull, each of said calculations being made using the relationship $$PDI'_{CPOSMDS}; PDI'_{NORM} = \frac{1}{\overline{d}} \sqrt{\frac{n'}{A_{poly}}}$$

where $\overline{d}$=average Euclidean distance among all possible pairs of the workplace elements; and deciding whether said workspace-operational-criteria-configuration is acceptable as a candidate layout relative to said experimental configuration based upon a comparison of the density index, $PDI'_{CPOSMDS}$, with the density index, $PDI'_{NORM}$, and if so to print out a plot, through the employment of computer implementation, representing the locations of said workplace elements in said subarea of the building in accordance with said configuration.

3. The method of claim 1 wherein said composite-facility-operational-criteria-Cartesian-configuration-of-building units is deemed unacceptable if the density indices ratio, $PDI_{CPOSMDS}$: $PDI_{NORM}$, is below a predetermined threshold value.

4. The method of claim 1 wherein said experimental-building units-configuration from whence comes the data used in generating the at least two MDS, building units matrices, and said experimental-building units-configuration whose n building units are circumscribed by said second convex hull are one-in-the-same, and this one-in-the-same configuration is based upon an intuitive expert response to knowledge regarding the function served by the facility.

5. The method of claim 1 wherein said facility-operational-criteria-building units-configuration is decided to be acceptable, and wherein the method further includes the step of empirically adjusting the configuration of the building units in response to constraining physical features associated with the global area.

6. The method of claim 1 wherein the first and second convex hulls are formed by connecting the perimetrically located building units of the corresponding building units-configuration by straight lines, thereby forming the border of a polygon having said polygon area, $A_{poly}$.

7. The method of claim 1 wherein the third and fourth convex hulls are formed by connecting the perimetrically located workplace elements of the corresponding workplace-element-configuration by straight lines, thereby forming the border of a polygon having said polygon area, $A_{poly}$.

8. The method of claim 2 wherein said composite-workspace-operational-criteria-Cartesian-configuration-of-workplace elements is deemed unacceptable if the density indices ratio, $PDI'_{CPOSMDS}$: $PDI'_{NORM}$, is below a predetermined threshold value.

9. The method of claim 2 wherein said experimental-configuration from whence comes the data used in generating the at least two MDS, workplace elements matrices, and said experimental workplace elements configuration whose n' building units are circumscribed by said second fourth hull are one-in-the-same, and this one-in-the-same, configuration is based upon an intuitive expert response to knowledge regarding the function served by the workspace.

10. The method of claim 2 wherein said facility-operational-criteria-configuration is decided to be acceptable, and wherein the method further includes the step of empirically adjusting the configuration of the workplace elements in response to constraining physical features associated with the subarea area.

* * * * *